United States Patent
Wall et al.

(10) Patent No.: US 12,165,530 B2
(45) Date of Patent: Dec. 10, 2024

(54) COMPUTER-IMPLEMENTED METHODS FOR ENABLING OPTIMISATION OF DERATE FOR A PROPULSION SYSTEM OF A VEHICLE

(71) Applicant: ROLLS-ROYCE PLC, London (GB)

(72) Inventors: Derek S Wall, Derby (GB); Andrew R Mills, Sheffield (GB); Peter A Beecroft, Derby (GB); Marko Bacic, Oxford (GB); Romain Guicherd, Sheffield (GB)

(73) Assignee: ROLLS-ROYCE plc, London (GB)

( * ) Notice: Subject to any disclaimer, the term of this patent is extended or adjusted under 35 U.S.C. 154(b) by 277 days.

(21) Appl. No.: 17/883,815

(22) Filed: Aug. 9, 2022

(65) Prior Publication Data

US 2023/0146869 A1    May 11, 2023

(30) Foreign Application Priority Data

Aug. 25, 2021  (GB) ...................................... 2112168

(51) Int. Cl.
*G08G 5/00* (2006.01)

(52) U.S. Cl.
CPC ........... *G08G 5/0065* (2013.01); *G08G 5/003* (2013.01)

(58) Field of Classification Search
CPC .. G08G 5/0065; G08G 5/003; F05D 2260/81; F05D 2270/71; F02C 9/18; F02C 9/52; F02C 9/28; F02C 9/00; B64D 31/00; G01M 15/14
See application file for complete search history.

(56) References Cited

U.S. PATENT DOCUMENTS

| | | | |
|---|---|---|---|
| 5,628,185 A | 5/1997 | Rowe | |
| 9,564,056 B1 * | 2/2017 | Ghaemi | ................... G06F 17/13 |
| 2003/0160586 A1 | 8/2003 | Donnelly et al. | |
| 2005/0045058 A1 | 3/2005 | Donnelly et al. | |
| 2005/0287034 A1 | 12/2005 | Wills et al. | |
| 2010/0204909 A1 | 8/2010 | Gayraud et al. | |
| 2012/0029735 A1 | 2/2012 | Bakker | |
| 2015/0219034 A1 * | 8/2015 | Boettcher | ........... F02D 41/2422 |
| | | | 123/349 |
| 2015/0285159 A1 | 10/2015 | Belghagi et al. | |

(Continued)

FOREIGN PATENT DOCUMENTS

| | | |
|---|---|---|
| EP | 1 830 237 A1 | 9/2007 |
| GB | 2543902 A | 5/2017 |
| WO | 2019/002925 A1 | 1/2019 |

OTHER PUBLICATIONS

Feb. 24, 2022 Search Report issued in British Patent Application No. 2112168.6.

(Continued)

*Primary Examiner* — Abdalla A Khaled
(74) *Attorney, Agent, or Firm* — Oliff PLC

(57) ABSTRACT

A computer-implemented method of enabling optimisation of derate for a propulsion system of a vehicle, the method comprising: determining a derate for the propulsion system of the vehicle using: an algorithm; a vehicle model defining path constraints for the vehicle through space; a propulsion system model defining parameters of the propulsion system; an objective function defining one or more objectives; and controlling output of the determined derate.

16 Claims, 10 Drawing Sheets

(56) References Cited

U.S. PATENT DOCUMENTS

| | | |
|---|---|---|
| 2015/0323933 A1 | 11/2015 | Darbois et al. |
| 2016/0031564 A1 | 2/2016 | Yates |
| 2016/0252019 A1 | 9/2016 | Joshi et al. |
| 2017/0090482 A1* | 3/2017 | Zammit-Mangion ........................ G06Q 50/40 |
| 2017/0191375 A1 | 7/2017 | Vela et al. |
| 2017/0286572 A1 | 10/2017 | Hershey et al. |
| 2018/0154381 A1 | 6/2018 | Bewlay et al. |
| 2018/0155060 A1* | 6/2018 | Dauenhauer ............... B64F 5/30 |
| 2018/0164796 A1* | 6/2018 | Garciamoreno ...... F01D 21/003 |
| 2018/0238243 A1* | 8/2018 | Poth, Jr. ..................... F02C 9/16 |
| 2018/0362190 A1* | 12/2018 | Chambers ................. B64F 5/60 |
| 2019/0005826 A1* | 1/2019 | Lax ....................... G08G 5/0091 |
| 2019/0093505 A1 | 3/2019 | Escriche et al. |
| 2019/0093568 A1 | 3/2019 | Escriche et al. |
| 2019/0121369 A1* | 4/2019 | DiRusso .......... G06Q 10/06315 |
| 2019/0146436 A1* | 5/2019 | Perez Zarate .......... G16H 40/67 700/287 |
| 2019/0146470 A1* | 5/2019 | Akkaram ........... G05B 23/0289 700/30 |
| 2019/0286166 A1* | 9/2019 | De Lima ................. G08G 5/00 |
| 2019/0382121 A1 | 12/2019 | Schwarz et al. |
| 2019/0382123 A1 | 12/2019 | Schwarz et al. |
| 2020/0026307 A1* | 1/2020 | Lax ....................... G08G 5/0039 |
| 2020/0131996 A1 | 4/2020 | Hanlon et al. |
| 2020/0131997 A1 | 4/2020 | Hanlon et al. |
| 2020/0168106 A1* | 5/2020 | De Prins .............. G08G 5/0021 |
| 2020/0257313 A1* | 8/2020 | DiRusso ................. B64C 13/18 |
| 2020/0307831 A1* | 10/2020 | Huynh .................. B64G 1/405 |
| 2021/0139156 A1* | 5/2021 | Hamel ...................... F02C 9/28 |
| 2023/0230488 A1* | 7/2023 | Wall ....................... G05D 1/101 701/528 |

OTHER PUBLICATIONS

May 20, 2022 Search Report issued in British Patent Application No. 2112169.4.

Rick Donaldson et al. "Economic Impact of Derated Climb on Large Commercial Engines". 2007 Performance and Flight Operations Engineering Conference.

Will James et al. "Derated Climb Performance in Large Civil Aircraft". 2005 Performance and Flight Operations Engineering Conference.

Kenneth Chircop et al. "Bi-Objective Pseudospectral Optimal Control Techniques for Aircraft Trajectory Optimisation". 28th International Congress of the Aeronautical Sciences.

"Take-Off Performance Calculation and Entry Errors: a Global Perspective". ATSB Transport Safety Report, Aviation Research and Analysis Report.

Jan. 27, 2023 Extended European Search Report issued in European Patent Application No. 22189625.1.

U.S. Appl. No. 17/890,613, filed Aug. 18, 2022 in the name of Wall et al.

Jun. 6, 2024 Office Action issued in U.S. Appl. No. 17/890,613.

* cited by examiner

COMPUTER-IMPLEMENTED METHODS FOR ENABLING OPTIMISATION OF DERATE FOR A PROPULSION SYSTEM OF A VEHICLE

CROSS-REFERENCE TO RELATED APPLICATIONS

This specification is based upon and claims the benefit of priority from UK Patent Application Number 2112168.6 filed on 25 Aug. 2021, the entire contents of which are incorporated herein by reference.

TECHNOLOGICAL FIELD

The present disclosure relates to computer-implemented methods, apparatus, computer programs and non-transitory computer readable storage mediums for enabling optimisation of derate for a propulsion system of a vehicle.

BACKGROUND

Vehicles, such as aircraft, locomotives, and marine vessels, usually comprise a propulsion system that is arranged to provide thrust to the vehicle to move the vehicle along a path. Some portions of the path may require, or benefit from a significant amount of thrust from the propulsion system (for example, take-off and climb of an aircraft) and the vehicle operator may wish to utilise the full thrust capacity of the propulsion system. However, such use may cause rapid degradation of the propulsion system and thus increased maintenance and cost.

In order to reduce operating costs, the vehicle operator may apply a fixed value of derate to the propulsion system for at least a portion of the path to limit the useable thrust capacity of the propulsion system (for example, maximum available thrust may be limited to eighty or ninety percent of the full thrust capacity of the propulsion system). However, the application of a fixed value of derate may not be suitable for all journeys of the vehicle (adverse weather journeys for example) and this may lead to the vehicle operator defaulting to using the full thrust capacity of the propulsion system.

BRIEF SUMMARY

According to a first aspect there is provided a computer-implemented method of enabling optimisation of derate for a propulsion system of a vehicle, the method comprising: determining a derate for the propulsion system of the vehicle using: an algorithm; a vehicle model defining path constraints for the vehicle through space; a propulsion system model defining parameters of the propulsion system; an objective function defining one or more objectives; and controlling output of the determined derate.

Controlling output may include controlling storage of the determined derate in a memory.

Controlling output may include controlling an output device to provide a plurality of derate options to an operator. The plurality of derate options may include the determined derate.

The computer-implemented method may further comprise: receiving a user input signal comprising data identifying a selected derate, the selected derate being one of the plurality of derate options; determining one or more propulsion system operational parameter thresholds using the selected derate.

The selected derate may be the determined derate.

The computer-implemented method may further comprise determining one or more propulsion system operational parameter thresholds using the determined derate.

The computer-implemented method may further comprise controlling operation of the propulsion system using the determined one or more propulsion system operational parameter thresholds.

Determining the derate for the propulsion system of the vehicle may further comprise using a navigation model defining navigation constraints for the vehicle.

The computer-implemented method may further comprise: receiving navigation data for a location of the vehicle; and determining the navigation constraints using the received navigation data and the navigation model.

The one or more objectives of the objective function may comprise one or more of: degradation of the propulsion system; acoustic emissions of the propulsion system; combustion emissions of the propulsion system; and energy consumption of the propulsion system.

The computer-implemented method may further comprise: receiving a user input signal comprising data identifying a user preference for the objective function; and changing the objective function to include the received user preference.

The algorithm may be an optimisation algorithm.

The parameters of the propulsion system may include one or more of: operational parameters of the propulsion system; and health parameters of the propulsion system.

The computer-implemented method may further comprise: determining a trajectory for the vehicle using the algorithm, the vehicle model, the propulsion system model, and the objective function.

The vehicle may be an aircraft and the determined derate may be for a take-off flight phase and a climb flight phase of the aircraft.

According to a second aspect there is provided a computer program that, when executed by a computer, causes performance of the computer-implemented method as described in any of the preceding paragraphs.

According to a third aspect there is provided a non-transitory computer readable storage medium comprising computer readable instructions that, when executed by a computer, cause performance of the computer-implemented method as described in any of the preceding paragraphs.

According to a fourth aspect there is provided an apparatus for enabling optimisation of derate for a propulsion system of a vehicle, the apparatus comprising: a controller configured to perform the computer-implemented method as described in any of the preceding paragraphs.

The apparatus may comprise an electronic flight bag.

The apparatus may comprise a flight management system.

The apparatus may comprise a full authority digital engine controller.

The apparatus may comprise a data centre, remote from the vehicle.

According to a fifth aspect there is provided a computer-implemented method of enabling optimisation of trajectory for a vehicle, the method comprising: determining a trajectory for the vehicle using: an algorithm; a vehicle model defining path constraints for the vehicle through space; a propulsion system model defining parameters of a propulsion system of the vehicle; an objective function defining one or more objectives; and controlling output of the determined trajectory.

Controlling output may include controlling storage of the determined trajectory in a memory.

Controlling output may include controlling output of the determined trajectory to an automated vehicle control system.

The automated control system may be an automatic flight control system.

The computer-implemented method may further comprise determining one or more vehicle operational parameters using the determined trajectory.

The computer-implemented method may further comprise: controlling operation of the vehicle using the determined one or more vehicle operational parameters.

The determined one or more vehicle operational parameters may comprise a vehicle orientation demand and/or a propulsion system thrust demand.

Determining the derate for the propulsion system of the vehicle may further comprise using a navigation model defining navigation constraints for the vehicle.

The computer-implemented method may further comprise: receiving navigation data for a location of the vehicle; and determining the navigation constraints using the received navigation data and the navigation model.

The one or more objectives of the objective function may comprise: degradation of the propulsion system; acoustic emissions of the propulsion system; combustion emissions of the propulsion system; and energy consumption of the propulsion system.

The algorithm may be an optimisation algorithm.

The parameters of the propulsion system may include one or more of: operational parameters of the propulsion system; and health parameters of the propulsion system.

The computer-implemented method may further comprise determining a derate for the propulsion system of the vehicle using the algorithm, the vehicle model, the propulsion system model, and the objective function.

The vehicle may be an aircraft and the determined trajectory may be for a take-off flight phase and a climb flight phase of the aircraft.

According to a sixth aspect there is provided a computer program that, when executed by a computer, causes performance of the computer-implemented method as described in any of the preceding paragraphs.

According to a seventh aspect there is provided a non-transitory computer readable storage medium comprising computer readable instructions that, when executed by a computer, cause performance of the computer-implemented method as described in any of the preceding paragraphs.

According to an eighth aspect there is provided an apparatus for enabling optimisation of trajectory for a vehicle, the apparatus comprising: a controller configured to perform the computer-implemented method as described in any of the preceding paragraphs.

The apparatus may comprise an electronic flight bag.

The apparatus may comprise a flight management system.

The apparatus may comprise a data centre, remote from the vehicle.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
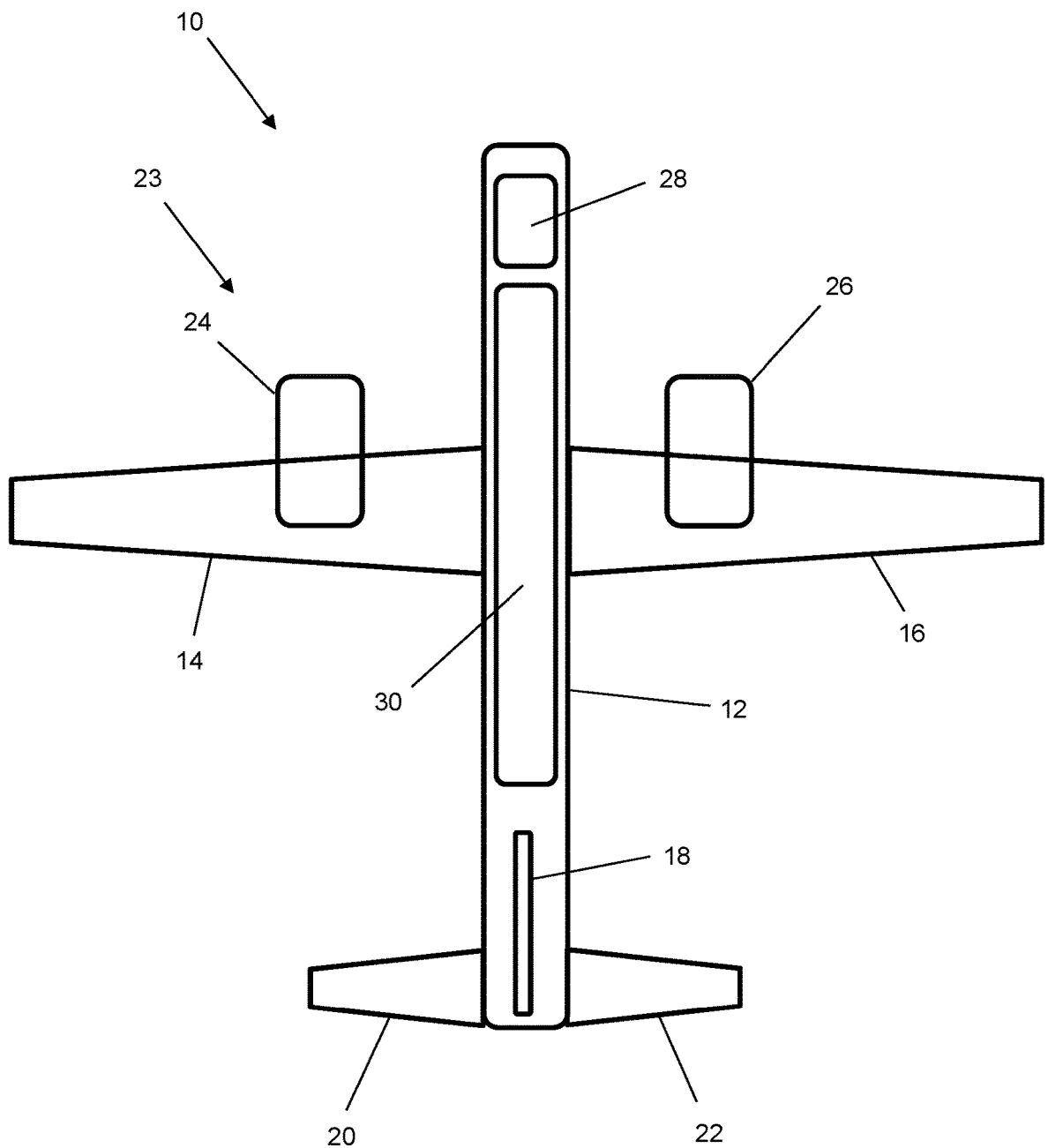
FIG. 1 illustrates a schematic plan view of an aircraft.

FIG. 1 illustrates a schematic diagram of a vehicle 10. As illustrated, the vehicle 10 may be aircraft 10 that includes a fuselage 12, a first wing 14, a second wing 16, a vertical stabilizer 18, a first horizontal stabilizer 20, a second horizontal stabilizer 22, and a propulsion system 23. The fuselage 12 includes a cockpit 28 and may additionally include a cabin 30. The propulsion system 23 includes a first propulsor 24 coupled to the first wing 14 and a second propulsor 26 that is coupled to the second wing 16. In other examples, the propulsion system 23 may include any number of propulsors (such as one propulsor or four propulsors for example).

The first propulsor 24 may be a gas turbine engine, such as a turbo-fan engine, a turbo-jet engine or a turbo-prop engine. Similarly, the second propulsor 26 may be a gas turbine engine, such as a turbo-fan engine, a turbo-jet engine or a turbo-prop engine. In other examples, the first and second propulsors 24, 26 may each comprise an electrical motor coupled to a fan or propeller for providing propulsive thrust to the aircraft 10.

It should be appreciated that the aircraft 10 may have an alternative configuration to that illustrated in FIG. 1. For example, the aircraft 10 may include a plurality of propulsors coupled to the first wing 14 and a plurality of propulsors coupled to the second wing 16. By way of another example, one or more propulsors may be coupled to the fuselage 12 instead of the wings 14, 16. In other examples, the aircraft 10 may have a different number of wings and may have a 'blended wing' configuration, a 'flying wing' configuration, or a 'lifting body' configuration. In further examples, the aircraft 10 may be a rotorcraft such as helicopter, or a powered lift aircraft.

In other examples, the vehicle 10 may be a watercraft comprising a propulsion system 23, or a land vehicle (such as a locomotive) that comprises a propulsion system 23.

Figure 2:
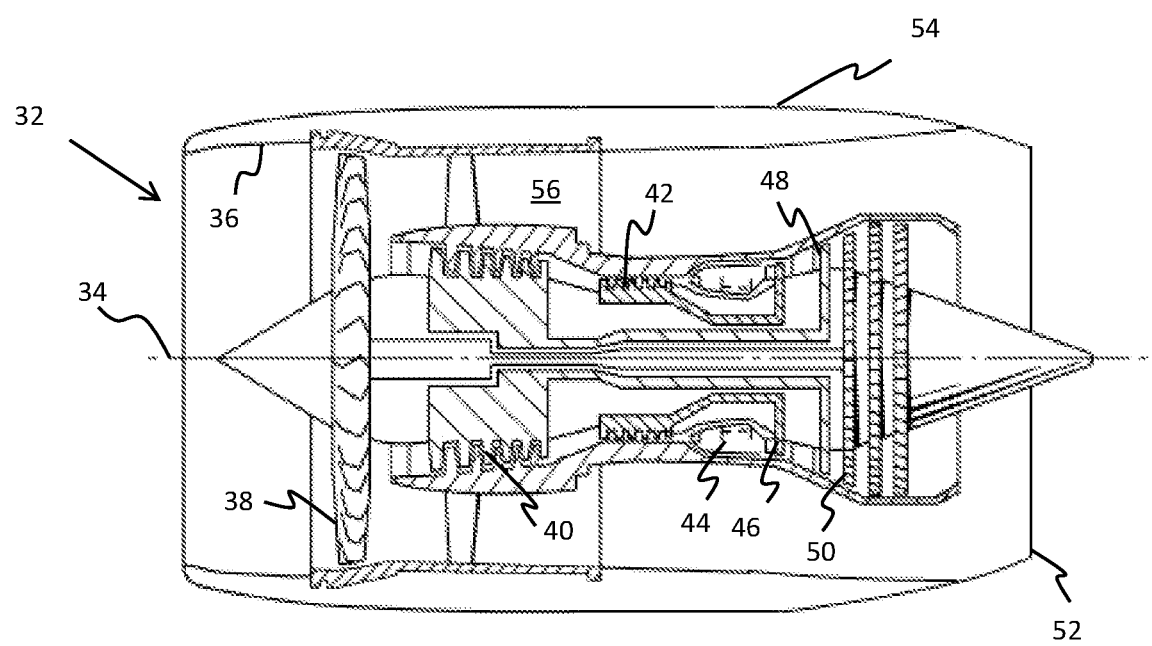
FIG. 2 illustrates a schematic cross-sectional side view of a gas turbine engine.

FIG. 2 illustrates an example of a gas turbine engine 32 which may be used in the propulsion system 23 (for example, as the first propulsor 24, or as the second propulsor 26). The gas turbine engine 32 is a turbo-fan and has a principal and rotational axis 34. The engine 32 comprises, in axial flow series, an air intake 36, a propulsive fan 38, an intermediate pressure compressor 40, a high-pressure compressor 42, combustion equipment 44, a high-pressure turbine 46, an intermediate pressure turbine 48, a low-pressure turbine 50 and an exhaust nozzle 52. A nacelle 54 generally surrounds the gas turbine engine 32 and defines both the intake 36 and the exhaust nozzle 52.

In operation, air entering the intake 36 of the gas turbine engine 32 is accelerated by the fan 38 to produce two air flows: a first air flow into the intermediate pressure compressor 40 and a second air flow which passes through a bypass duct 56 to provide propulsive thrust. The intermediate pressure compressor 40 compresses the air flow directed into it before delivering that air to the high-pressure compressor 42 where further compression takes place.

The compressed air exhausted from the high-pressure compressor 42 is directed into the combustion equipment 44 where it is mixed with fuel and the mixture combusted. The resultant hot combustion products then expand through, and thereby drive the high, intermediate and low-pressure turbines 46, 48, 50 before being exhausted through the nozzle 52 to provide additional propulsive thrust. The high, intermediate and low-pressure turbines 46, 48, 50 drive respectively the high-pressure compressor 42, intermediate pressure compressor 40 and fan 38, each by a suitable interconnecting shaft.

Other gas turbine engines to which the present disclosure may be applied may have alternative configurations. By way of example, such gas turbine engines may have an alternative number of interconnecting shafts (for example, two interconnecting shafts) and/or an alternative number of compressors and/or turbines. Furthermore, such gas turbine engines may comprise a gearbox provided in the drive train from a turbine to a compressor and/or fan.

Figure 3:
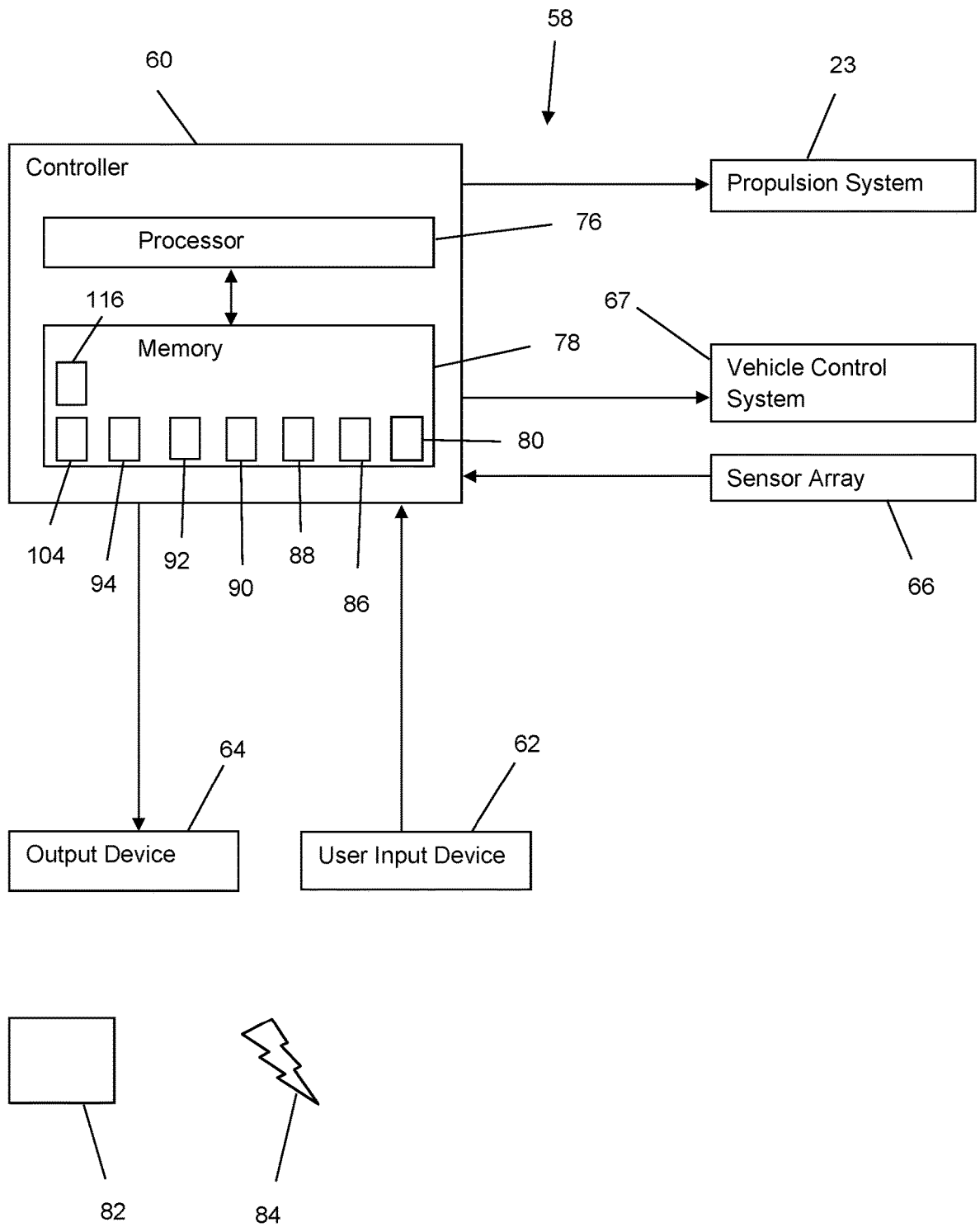
FIG. 3 illustrates a schematic diagram of an apparatus according to various examples.

FIG. 3 illustrates a schematic diagram of an apparatus 58 according to various examples. The apparatus 58 includes a controller 60, a user input device 62, an output device 64, a sensor array 66, a vehicle control system 67, and the propulsion system 23. In some examples, the apparatus 58 may be a module. As used herein, the wording 'module' refers to a device or apparatus where one or more features are included at a later time and, possibly, by another manufacturer or by an end user. For example, where the apparatus 58 is a module, the apparatus 58 may only include the controller 60, and the remaining features may be added by another manufacturer, or by an end user.

The controller 60, the user input device 62, the output device 64, the sensor array 66, the vehicle control system 67 and the propulsion system 23 may be coupled to one another via wireless links and may consequently comprise transceiver circuitry and one or more antennas. Additionally, or alternatively, the controller 60, the user input device 62, the output device 64, the sensor array 66, the vehicle control system 67, and the propulsion system 23 may be coupled to one another via wired links and may consequently comprise interface circuitry (such as a Universal Serial Bus (USB) socket).

Figure 8:
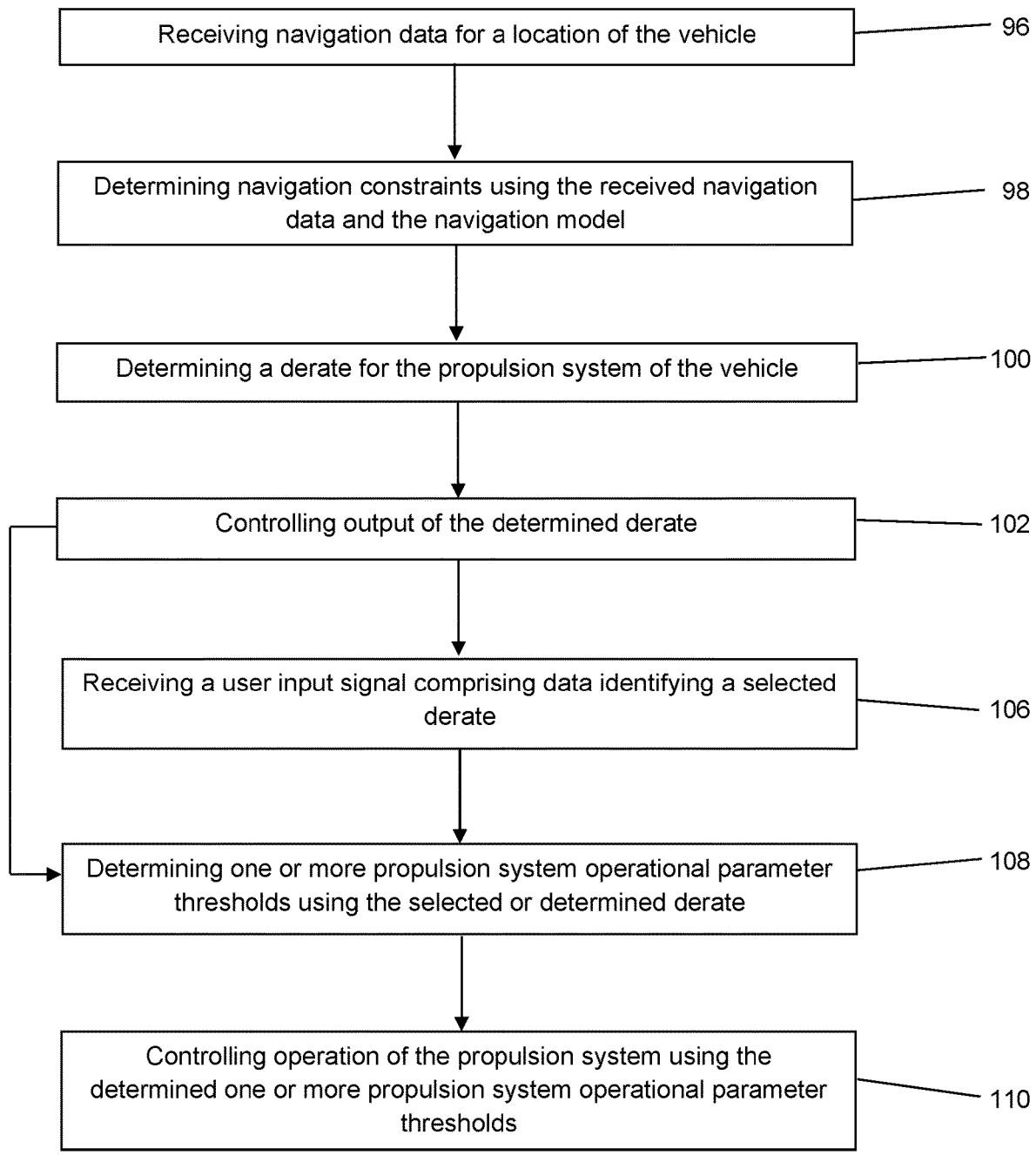
FIG. 8 illustrates a flow diagram of a computer-implemented method of enabling optimisation of derate for a propulsion system of a vehicle according to various examples.
Figure 9:
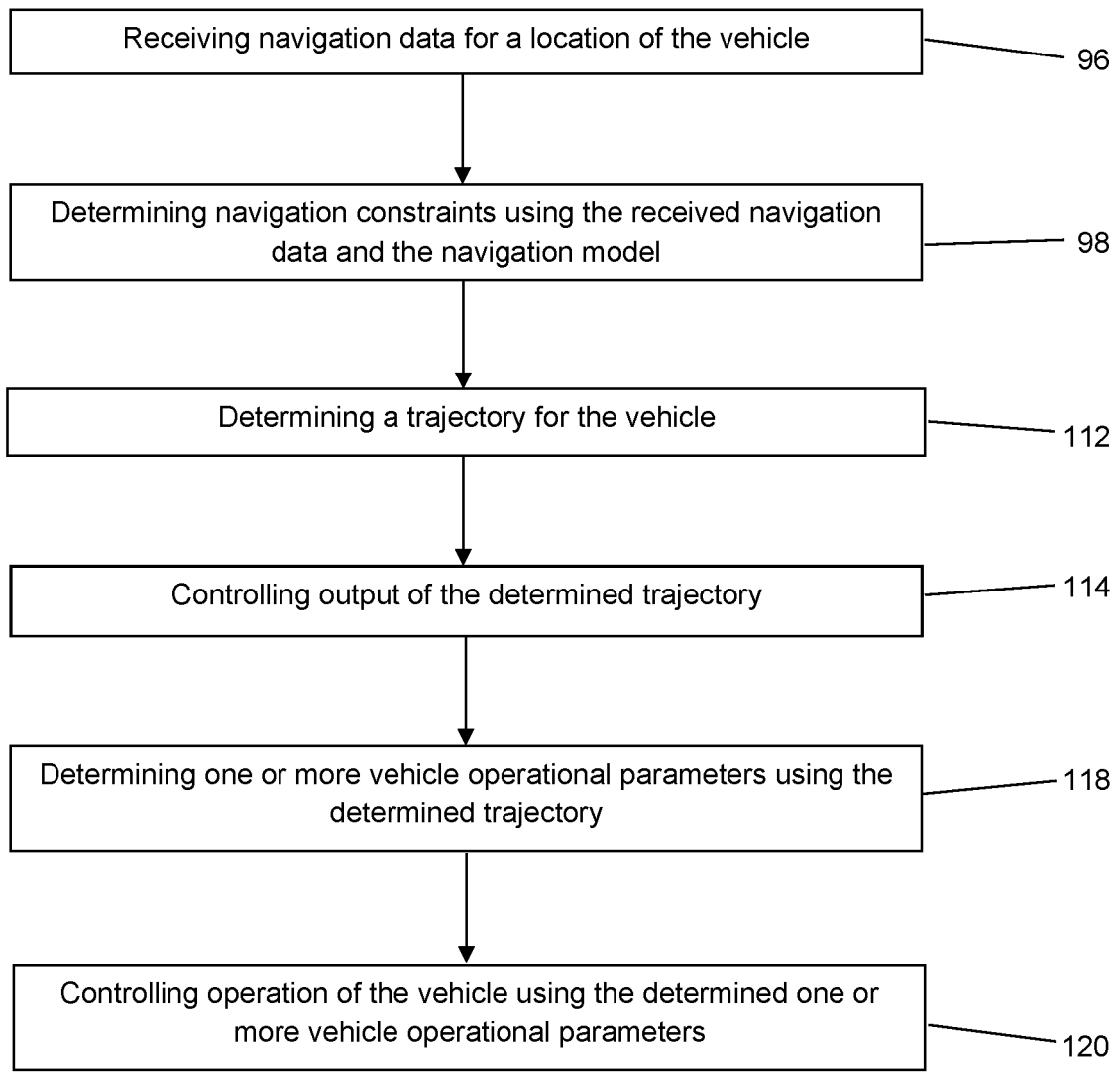
FIG. 9 illustrates a flow diagram of a computer-implemented method of enabling optimisation of trajectory for a vehicle according to various examples.
Figure 10:
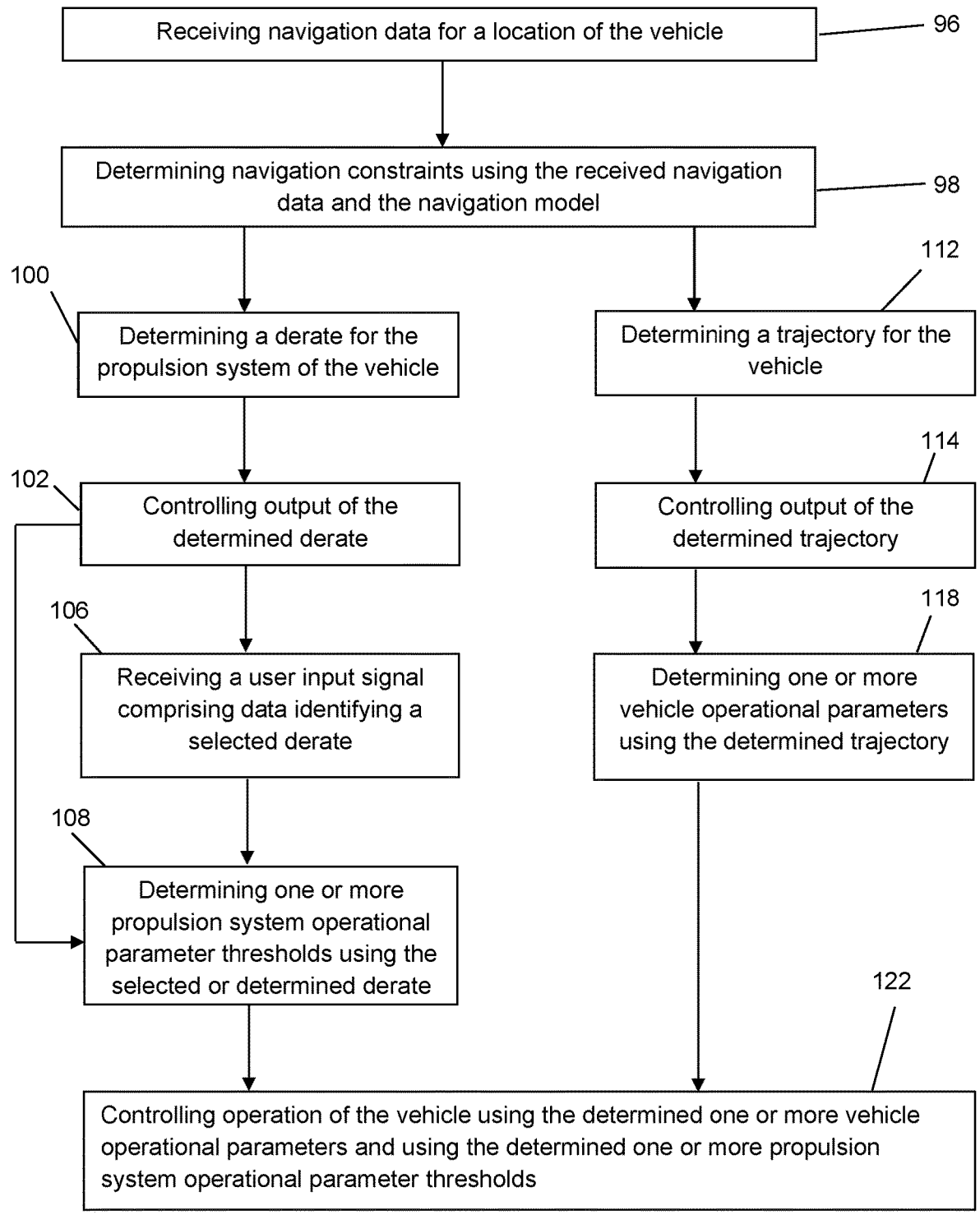
FIG. 10 illustrates a flow diagram of a computer-implemented method of enabling optimisation of propulsion system derate and vehicle trajectory according to various examples.

The controller 60 may comprise any suitable circuitry to cause performance of the methods described herein and as illustrated in FIGS. 8, 9 and 10. The controller 60 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

The controller 60 may be provided by one or more controllers of the vehicle 10 and/or one or more controllers external to the vehicle 10 that are connected to one another by wired and/or wireless links (that is, the controller 60 may have a distributed architecture). For example, the controller 60 may be provided (at least partly) by one or more data centres that are external to the vehicle 10 (that is, the controller 60 may be provided at least partly by the 'cloud'). Additionally, or alternatively, the controller 60 may be provided (at least partly) by an electronic flight bag (such as a tablet computer) that is external to the vehicle 10 and may be handled by an operator of the vehicle 10. Additionally, or alternatively, the controller 60 may be provided (at least partly) by a flight management system that may be mounted on the fuselage 12 of the aircraft 10. Additionally, or alternatively, the controller 60 may be provided (at least partly) by an automatic flight control system that may be mounted on the fuselage 12 of the aircraft 10. Additionally, or alternatively, the controller 60 may be provided (at least partly) by a full authority digital engine controller (FADEC), an electronic engine controller (EEC) or an engine control unit (ECU), and may be located on the propulsion system (that is, on the first propulsor 24 and/or on the second propulsor 26).

Figure 4:
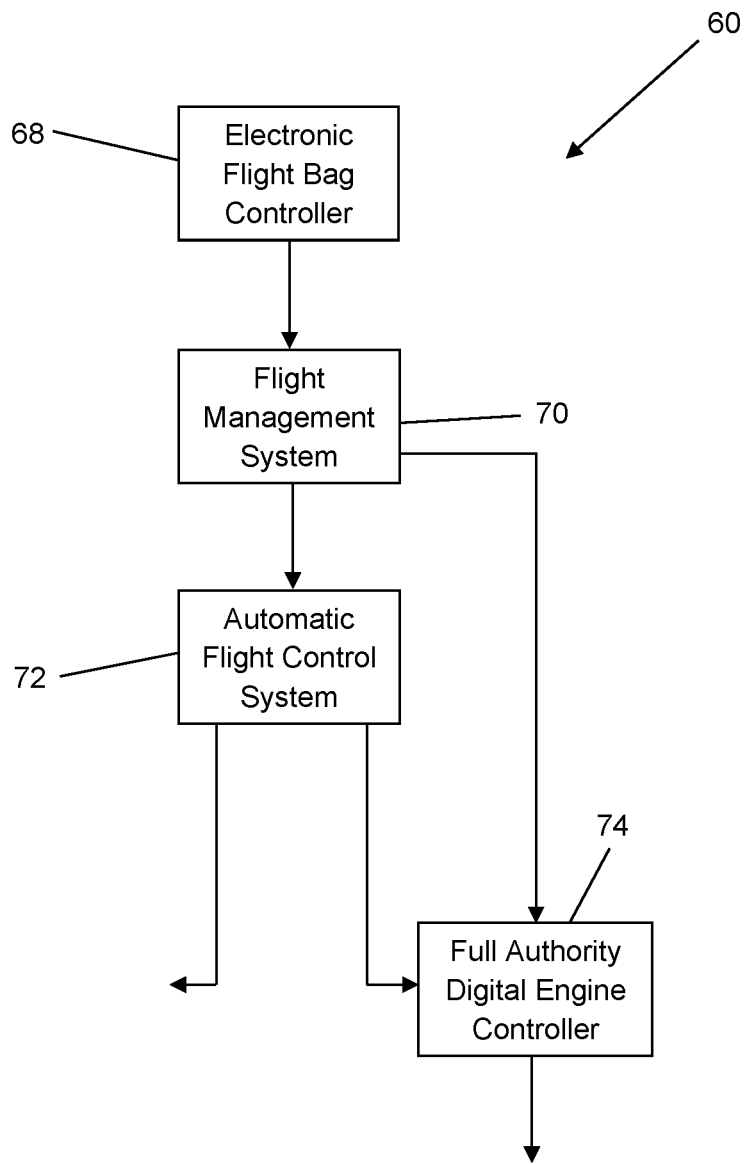
FIG. 4 illustrates a schematic diagram of an apparatus according to an example.

An example of a controller 60 that is provided by a plurality of separate controllers is illustrated in FIG. 4. In this example, the controller 60 comprises an electronic flight bag controller 68, a flight management system 70, an automatic flight control system 72 (which may also be referred to as an 'autopilot'), and a full authority digital engine controller (FADEC) 74.

In various examples, the controller 60 may comprise at least one processor 76 and at least one memory 78. The memory 78 stores one or more computer programs 80 comprising computer readable instructions that, when executed by the processor 76, causes performance of the methods described herein, and as illustrated in FIGS. 8, 9 and 10. The computer program 80 may be software or firmware, or may be a combination of software and firmware.

The processor 76 may include at least one microprocessor and may comprise a single core processor or may comprise multiple processor cores (such as a dual core processor or a quad core processor). In some examples, the processor 76 may comprise a plurality of processors (at least one of which may comprise multiple processor cores).

The memory 78 may be any suitable non-transitory computer readable storage medium, data storage device or devices, and may comprise magnetic storage (such as a hard disk drive) and/or solid-state memory (such as flash memory). The memory 78 may be permanent non-removable memory, or may be removable memory (such as a universal serial bus (USB) flash drive or a secure digital card). The memory 78 may include: local memory employed during actual execution of the computer program 80; bulk storage; and cache memories which provide temporary storage of at least some computer readable or computer usable program code to reduce the number of times code may be retrieved from bulk storage during execution of the code.

The computer program 80 may be stored on a non-transitory computer readable storage medium 82. The computer program 80 may be transferred from the non-transitory computer readable storage medium 82 to the memory 78. The non-transitory computer readable storage medium 82 may be, for example, a USB flash drive, a secure digital (SD) card, an optical disc (such as a compact disc (CD), a digital versatile disc (DVD) or a Blu-ray disc). In some examples, the computer program 80 may be transferred to the memory 78 via a signal 84 (such as a wireless signal or a wired signal).

The memory 78 also stores a vehicle model 86, a propulsion system model 88, an objective function 92, an algorithm 94 and, optionally, a navigation model 90. The vehicle model 86, the propulsion system model 88 and the navigation model 90 may comprise differential algebraic equations and constraints. The algorithm 94 uses the vehicle model 86, the propulsion system model 88, the navigation model 90 and the objective function 92 as inputs to return one or more optimised derates for the propulsion system and/or an optimised trajectory for the vehicle 10.

It should be appreciated that the memory 78 may store a plurality of different vehicle models 86 for a plurality of different types of vehicles (for example, different types of aircraft). Similarly, the memory 78 may store a plurality of different propulsion system models 88 for a plurality of different propulsion systems (for example, different types of gas turbine engine). Additionally, the memory 78 may store a plurality of navigation models 90 for a plurality of different locations (for example, different airports).

The vehicle model 86 defines path constraints for the vehicle 10 through space. Where the vehicle 10 is an aircraft, the vehicle model 86 may also include an atmospheric model, representing the variation of air pressure, temperature, density and local speed of sound. In addition, flight envelope constraints may be enforced, guaranteeing that the aircraft trajectories generated are within the normal flight control law set, and thus are feasible for the flight control system 67.

Figure 5:
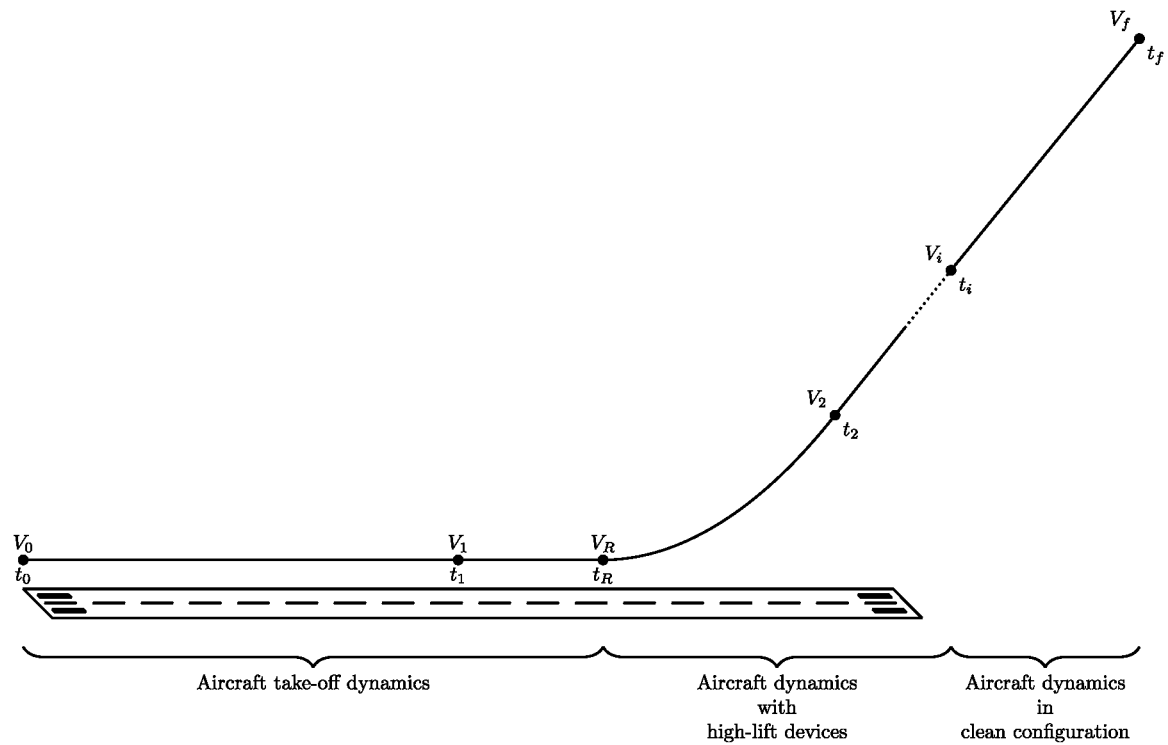
FIG. 5 illustrates a path of an aircraft according to an example.

By way of an example, the vehicle model 86 may comprise a plurality of kinematic equations that define the velocity of the vehicle 10 (that is, the rate of change of latitude, longitude and altitude) and a plurality of dynamic equations that define the acceleration of the vehicle 10, the orientation of the vehicle 10, and the rate of change in mass of the vehicle 10 (due to the consumption of fuel during a journey).

Where the vehicle model 86 is for an aircraft, the data required to parameterise the vehicle model 86 may comprise aerodynamic coefficients for the lift, the drag and the side force of the aircraft 10. These coefficients are dependent on Mach number, angle of attack and side-slip angle as well as the high-lift devices configurations, such as slats and flaps. Different aircraft dynamics during a flight can be dealt with by breaking down the journey into phases. For example, FIG. 5 illustrates that during take-off and climb of the aircraft 10, there are aircraft take-off dynamics, aircraft dynamics with high-lift devices, and aircraft dynamics in clean configuration. The specific fuel consumption of the propulsion system 23 may be provided as a look-up table stored in the memory 78 to enable the computation of the aircraft mass variation.

Additional constraints on the vehicle model 86 may be encoded to guarantee that the vehicle 10 remains within safe bounds. For example, angle of attack and airspeed constraints may be provided to ensure the feasibility of the solution computed.

The propulsion system model 88 defines parameters of the propulsion system 23, such as operational parameters and/or health parameters of the propulsion system 23. For example, the propulsion system model 88 may model the thrust available at given altitudes and Mach number. Where the propulsion system 23 comprises a gas turbine engine, the propulsion system model 88 may also generate core (operational) parameters such as shaft speeds and turbine temperatures to enable assessment of engine degradation, and specific fuel consumption used to calculate the predicted block fuel. The propulsion system model 88 may also include specific additional models of transient disc thermal behaviour combined with the life impact (for example, from simple transient rim-to-bore gradient calculations, which may be used to assess life impact in the objective function 92, to full temperature distribution and complex objective function of the temperature field as well as transient speeds).

In some examples where the propulsion system model 88 defines health parameters, but does not define operational parameters, the controller 60 may calculate degradation directly for a derate and operating condition a priori and use this in the objective function 92 without using operational parameters.

In an example where the propulsion system comprises a gas turbine engine, the propulsion system model 88 may comprise a first equation and a second equation. The first equation includes the engine time constant that encodes any delay between the engine thrust demand and the delivery of actual net thrust. The second equation is a second order model that may be used to model engine states such as turbine temperature and low-pressure shaft speed. These models rely on natural frequencies and damping ratios for the different parameters considered. It may be assumed that at the beginning of the simulation, the engine runs in forward idle conditions at steady state. Also, it may be assumed that the known constraints exist on the engine parameters. In other examples, the propulsion system model 88 may use an alternative modelling approach, such as higher fidelity physics-based models, black box data driven models, and so on.

The navigation model 90 defines navigation constraints for the vehicle 10. The navigation constraints may, for example, define latitude and longitude coordinates along which the vehicle 10 may travel. Where the vehicle 10 is an aircraft, the navigation constraints may additionally define altitude constraints, and may be determined using standard instrument departure routes (SIDs) for the location of the vehicle 10, or may be input from a higher level automatic traffic management system from the take-off airport, or may be manually inputted by the pilot. The navigation constraints may be approximated by piecewise linear functions that ensure that the trajectory of the aircraft 10 will comply with the local air traffic control guidelines, and respect vertical and lateral separations with other aircraft.

In examples where the algorithm 94 does not use a navigation model and the vehicle 10 is an aircraft, a one-dimensional runway length may be used instead to determine runway derate. Additionally, or alternatively, where the algorithm 94 does not use a navigation model, a reference point in two-dimensional or three-dimensional space may be used.

Figure 6:
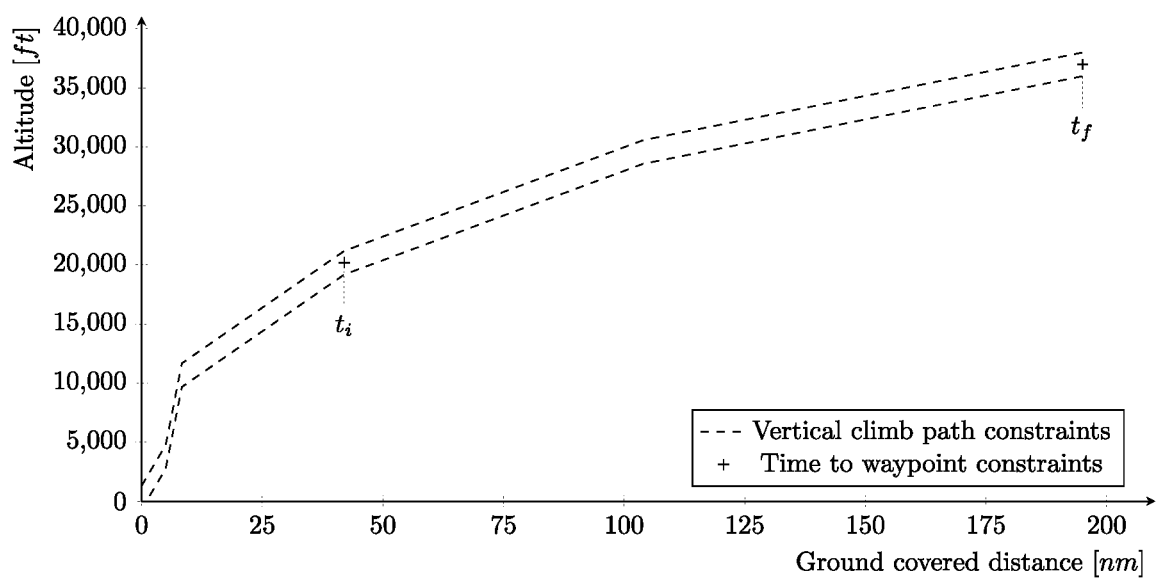
FIG. 6 illustrates a graph of navigation constraints according to a first example.
Figure 7:
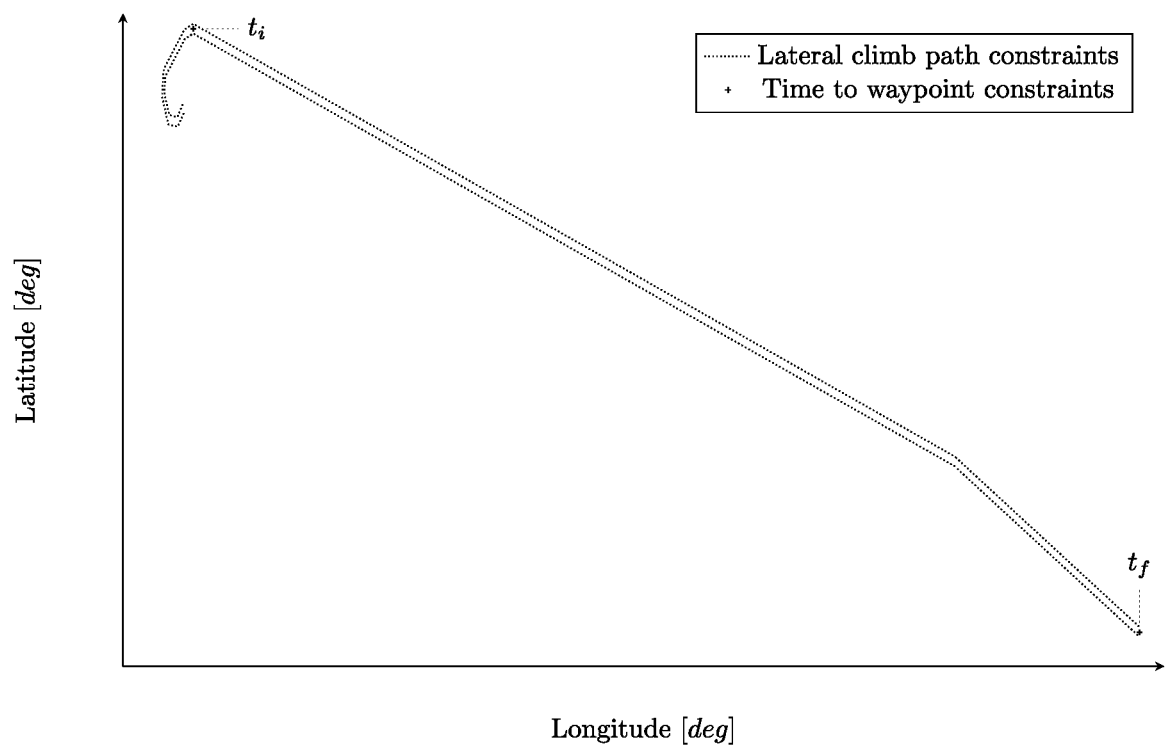
FIG. 7 illustrates a graph of navigation constraints according to a second example.

FIGS. 6 and 7 illustrate an example of navigation constraints for the aircraft 10 during part of a journey (for example, take-off and climb from an airport). In more detail, FIG. 6 illustrates a graph of altitude versus ground covered distance and includes a dotted line that represents vertical climb path constraints, and time to waypoint constraints indicated by the letters $t_i$ and $t_f$. FIG. 7 illustrates a graph of latitude versus longitude and includes a dotted line that represents lateral path constraints, and time to waypoint constraints indicated by the letters $t_i$ and $t_f$.

The objective function 92 defines one or more objectives which may, or may not, be weighted. The objective function may enable an operator of the vehicle 10 to express preferences for a journey. For example, a user may operate the user input device 62 to enter their preferences to the apparatus 58. The controller 60 may subsequently receive a user input signal comprising data identifying a user preference for the objective function (for example, a preference for a particular objective and/or weighting) and may then change the objective function to include the received user preference. The one or more objectives of the objective function 92 may comprise degradation of the propulsion system, energy consumption of the propulsion system (for example, the mass of fuel burnt), acoustic emissions of the propulsion system; and combustion emissions of the propulsion system. In other examples, the one or more objectives may additionally comprise journey time.

By way of an example, a weighted objective function including maintenance costs, time and fuel to reach top of climb for an aircraft may be formulated as follows:

$$J = w_{degradation} * \int_{t=0}^{t_f} \text{degradation}(\text{core parameters}, t) dt + w_{fuel} * m_{fuel} + w_t * t_f$$

This objective function groups three main costs along with their weighting (parameters w). The operator of the vehicle 10 may select a value between zero and one for each weight. A weight value of zero means that the cost is indifferent to the associated penalty, whereas a weight value of one indicates that the associated penalty plays an important role. The relative values of the weights chosen highlight the relative importance of each penalty. The objective function J gathers a degradation cost (computed as an integral over the flight time), the mass of block fuel burnt and the final time $t_f$ to reach top of climb. The degradation function may be constructed as a direct model or as a surrogate model for the dominant engine degradation mechanisms, such as turbine blade oxidation and turbine blade and disk creep. The most accurate models are dynamic (that is, dependent on time-history).

By way of another example, a sequential approach may be used instead of a weighted multi-objective objective function. In this framework, a single objective is optimised at a time, and then set as a constraint for the next iteration. This is then repeated for all the different objectives considered.

By way of a further example, a 'budget' for an objective may be received and may be used as a constraint. For example, a trajectory must incur less than x % degradation relative to a zero derate flight.

The algorithm 94 may be an optimisation algorithm and may use a pseudo spectral method, an interior point method, a single shooting method, a multiple shooting method, a direct collocation method, an orthogonal collocation method, a temporal finite element method, or a differential dynamic programming method to iteratively parse the objective function 92 and the constraints of the vehicle model 86, the propulsion system model 88, and the navigation model 90 to converge towards a feasible and optimal solution. In some examples, the algorithm 94 may also use an initial solution guess, for example, a trajectory and/or solution from a past flight database stored in the memory 78 (for example, a flight management system memory), or transmitted to the controller 60 from a data centre or other remote computer.

In other examples, the algorithm 94 may be a search/intelligent search algorithm, a constraint satisfaction algorithm, or may be a learning artificial intelligence algorithm. Finally, a problem may be simplified or approximated to a convex programming problem (such as a semi-definite programming problem, second order cone programming problem, and so on) through bounding the non-linear constraints and objectives with convex function. The advantage of this being that such problems can be solved efficiently in real-time by well-known methods (for example, alternative direction method of multipliers)

Input/output devices may be coupled to the controller 60 either directly or through intervening input/output controllers. Various communication adaptors may also be coupled to the controller 60 to enable the apparatus 58 to become coupled to other controllers, apparatus or remote printers or storage devices through intervening private or public networks. Non-limiting examples include modems and network adaptors of such communication adaptors.

The user input device 62 may comprise any suitable device or devices for enabling a user (for example, an operator of the vehicle 10) to at least partially control the apparatus 58. For example, the user input device 62 may comprise one or more of a keyboard, a keypad, a touchpad, a joystick, a button, a switch, and a touchscreen display. The user input device 62 may be integrated into the cockpit 28 of the aircraft 10, and/or may be part of an electronic flight bag. The controller 60 is configured to receive signals from the user input device 62.

The output device 64 may comprise any suitable device or devices for conveying information to a user. For example, the output device 64 may comprise a display (such as a liquid crystal display, or a light emitting diode display, or an active matrix organic light emitting diode display, or a thin film transistor display, or a cathode ray tube display), and/or a loudspeaker, and/or a printer (such as an inkjet printer or a laser printer). The output device 64 may be integrated into the cockpit 28 of the aircraft, and/or may be part of an electronic flight bag. The controller 60 is arranged to provide a signal to the output device 64 to cause the output device 64 to convey information to the user.

The sensor array 66 is configured to measure various parameters of the vehicle 10 and generate data for those parameters. The sensor array 66 comprises a plurality of sensors that may be positioned at any suitable locations on the vehicle 10 (including the propulsion system 23). The controller 60 is configured to receive the data generated by the sensor array 66.

The sensor array 66 may comprise any suitable types of sensors to measure the parameters of the aircraft 10 (including the parameters of the propulsion system 23). For example, the sensor array 66 may comprise one or more temperature sensors (thermometers, thermocouples for example), one or more pressure sensors, one or more vibration sensors, one or more phonic wheels, and one or more gyroscopes.

The vehicle control system 67 may comprise any suitable apparatus for controlling the direction of movement of the vehicle 10. Where the vehicle 10 is an aircraft as illustrated in FIG. 1, the vehicle control system 67 is an aircraft flight control system and comprises flight control surfaces such as a rudder, an elevator and ailerons. By way of another example, where the vehicle 10 is a watercraft, the vehicle control system 67 may comprise a rudder or podded propulsors.

The operation of the apparatus 58 is described in the following paragraphs with reference to FIGS. 8 to 10.

FIG. 8 illustrates a flow diagram of a computer-implemented method of enabling optimisation of derate for the propulsion system 23 of the vehicle 10 according to various examples.

At block 96, the method may include receiving navigation data for a location of the vehicle 10. For example, the controller 60 may receive navigation data for an airport at which the aircraft 10 is located and is scheduled to take-off from, and then store the navigation data in the memory 78. In other examples, the controller 60 may receive navigation data from an automatic traffic management system, or may receive navigation data from the operator of the vehicle 10 via the user input device 62. The navigation data may define characteristics of the take-off airport and may include standard instrument departure (SID) route data, weather/environmental conditions, and air traffic management (ATM) requirements. The navigation data may also include flight performance constraints such as time and airspeeds to reach at particular waypoints.

At block 98, the method may include determining navigation constraints using the received navigation data and the navigation model 90. For example, the controller 60 may read the navigation data stored in the memory 78 and use the navigation model 90 to convert the navigation data into navigation constraints. The controller 60 may then store the determined navigation constraints in the memory 78.

At block 100, the method includes determining a derate for the propulsion system 23 of the vehicle 10. The derate may be determined for all propulsors of the propulsion system 23, or separate (and potentially different) derates may be calculated for each propulsor of the propulsion system 23. For example, a first derate may be determined for the first propulsor 24 and a second derate (different to the first derate) may be determined for the second propulsor 26.

The controller 60 may determine a derate for the propulsion system 23 using the algorithm 94, the vehicle model 86, the propulsion system model 88, the objective function 92, and, optionally, the navigation model 90. For example, the controller 60 may use the algorithm 94 to parse the constraints of the models 86, 88, 90, the objective function 92, and optionally, an initial solution guess to iteratively converge towards a feasible and optimal derate. The determined derate may be optimised for take-off and/or climb of the aircraft 10. In other examples, the determined derate may alternatively, or additionally, be optimized for cruise and/or landing of the aircraft 10.

In some examples, the algorithm 94 may use additional constraints such as minimum predicted fuel remaining at top of climb or minimum airspeed after a given ground covered distance or above a particular altitude. Similarly, the take-off phase may include runway distance constraints to safely cater for rejected take-off scenarios, as well as different landing gear friction coefficients to model contaminated runways.

At block 102, the method includes controlling output of the determined derate. For example, the controller 60 may output the determined derate to the memory 78 to store the determined derate 104 in the memory 78. Additionally, or alternatively, the controller 60 may control the output device 64 to provide a plurality of derate options to an operator of the vehicle 10, the plurality of derate options including the derate determined at block 100. For example, the controller 60 may control a display of an electronic flight bag to display the derate determined at block 100, along with ten percent derate, twenty percent derate, and zero derate. In some examples, the electronic flight bag controller 68 may control output of the determined derate to the flight management system 70 as illustrated in FIG. 4.

At block 106, the method may include receiving a user input signal comprising data identifying a selected derate. For example, the operator of the vehicle 10 may select one of the derate options displayed at block 102 using the user input device 62, and the controller 60 may receive the user input signal comprising data identifying the selected derate from the user input device 62. In some examples, the selected derate may be the derate determined at block 100.

At block 108, the method may include determining one or more propulsion system operational parameter thresholds using the derate selected at block 106, or the derate determined at block 100. For example, the controller 60 may read the determined derate 104 stored in the memory 78 and determine one or more propulsion system operational parameter thresholds. Where the propulsion system comprises a gas turbine engine, propulsion system operational parameter thresholds may include maximum shaft speeds and maximum engine pressure ratios. In some examples, block 108 may be performed by the full authority digital engine controller 74.

At block 110, the method may include controlling operation of the propulsion system 23 using the determined one or more propulsion system operational parameter thresholds. For example, during operation of the vehicle 10, the controller 60 receives data from the sensor array 66 for the operational parameters of the propulsion system (shaft speed and engine pressure ratio data for example). The controller 60 uses the received data to determine whether the operational parameters have exceeded, or are within a predetermined proximity to the operational parameter thresholds, and if so, controls the propulsion system 23 to prevent the operational parameters from exceeding the determined operational parameter thresholds (for example, by reducing the amount of fuel being supplied to combustion equipment of a gas turbine engine, or by opening one or more air bleed valves of a gas turbine engine, or by variable geometry gas path flow actuation, or by nozzle control). The determined one or more propulsion system operational parameter thresholds (that is, the derate) may be implemented in an altitude scheduled fashion or may be a function of more than one parameter such as thrust, Mach number, and so on.

FIG. 9 illustrates a flow diagram of a computer-implemented method of enabling optimisation of trajectory for the vehicle 10 according to various examples. The method illustrated in FIG. 9 is similar to the method illustrated in FIG. 8, and where the blocks are similar, or are the same, the same reference numerals are used.

At block 96, the method may include receiving navigation data for a location of the vehicle 10. For example, the controller 60 may receive navigation data for an airport at which the aircraft 10 is located and is scheduled to take-off from, and then store the navigation data in the memory 78. In other examples, the controller 60 may receive navigation data from an automatic traffic management system, or may receive navigation data from the operator of the vehicle 10 via the user input device 62. The navigation data may define characteristics of the take-off airport and may include standard instrument departure (SID) route data. The navigation data may also include flight performance constraints such as time and airspeeds to reach at particular waypoints.

At block 98, the method may include determining navigation constraints using the received navigation data and the navigation model 90. For example, the controller 60 may read the navigation data stored in the memory 78 and then use the navigation model 90 to convert the navigation data into navigation constraints. The controller 60 may then store the determined navigation constraints in the memory 78.

At block 112, the method includes determining a trajectory for the vehicle 10. The controller 60 may determine a trajectory for the vehicle 10 using the algorithm 94, the vehicle model 86, the propulsion system model 88, the objective function 92, and, optionally, the navigation model 90. For example, the controller 60 may use the algorithm 94 to parse the constraints of the models 86, 88, 90, the objective function 92, and optionally, an initial solution guess to iteratively converge towards a feasible and optimal trajectory. The determined trajectory may be optimised for take-off and/or climb of the aircraft 10. In other examples, the determined trajectory may alternatively, or additionally, be optimized for cruise and/or landing of the aircraft 10.

In some examples, the algorithm 94 may use additional constraints such as minimum predicted fuel remaining at top of climb or minimum airspeed after a given ground covered distance or above a particular altitude. Similarly, the take-off phase may include runway distance constraints to safely cater for rejected take-off scenarios, as well as different landing gear friction coefficients to model contaminated runways.

At block 114, the method includes controlling output of the determined trajectory. For example, the controller 60 may output the determined trajectory to the memory 78 to store the determined trajectory 116 in the memory 78. Additionally, or alternatively, the controller 60 may control the output device 64 to provide the determined trajectory to an operator of the vehicle 10 to enable the operator to verify the determined trajectory. For example, the controller 60 may control a display of an electronic flight bag to display the trajectory determined at block 114. In some examples, the electronic flight bag controller 68 may control output of the determined trajectory to the flight management system 70 as illustrated in FIG. 4.

At block 118, the method may include determining one or more vehicle operational parameters using the determined trajectory. For example, the controller 60 may read the determined trajectory 116 from the memory 78 and then determine operational parameters for the vehicle control system 67 and operational parameters for the propulsion system 23 that will achieve the determined trajectory. The controller 60 may use one or more look-up tables to determine the one or more operational parameters. Where the vehicle 10 is an aircraft, the operational parameters of the vehicle control system 67 may be the positions of the aircraft elevator, rudder and ailerons, and the operational parameters of the propulsion system may include shaft speeds, pressure ratios, and fuel flow rate of one or more engines of the propulsion system.

In some examples, the automatic flight control system 72 may receive the determined trajectory from the flight management system 70, or from the electronic flight bag controller 68, or from an off-board hosted service through a communications link (one or more remote data centres for example). The automatic flight control system 72 may then determine an attitude demand and a thrust demand using the determined trajectory.

At block 120, the method may include controlling operation of the vehicle 10 using the one or more vehicle operational parameters determined at block 118. For example, the controller 60 may use the one or more operational parameters determined at block 118 to control the vehicle control system 67 and the propulsion system 23 to move along the determined trajectory. In some examples, the aircraft control system 67 may receive the attitude demand from the automatic flight control system 72 and then control the positions of the aircraft elevator, rudder and ailerons so that the aircraft 10 moves along the determined trajectory. The full authority digital engine controller 74 may receive the thrust demand from the flight management system 70 and then control the rate of fuel flow and bleed valves of a gas turbine engine of the propulsion system to enable the aircraft 10 to move along the determined trajectory.

FIG. 10 illustrates a flow diagram of a computer-implemented method of enabling optimisation of propulsion system derate and vehicle trajectory according to various examples. Consequently, the method illustrated in FIG. 10 is a combination of the methods illustrated in FIGS. 8 and 9 and where the blocks are similar or the same, the same reference numerals are used.

At block 96, the method may include receiving navigation data for a location of the vehicle 10. At block 98, the method may include determining navigation constraints using the received navigation data and the navigation model 90.

At block 100, the method includes determining a derate for the propulsion system 23 of the vehicle 10 using the algorithm 94, the vehicle model 86, the propulsion system model 88, the objective function 92, and, optionally, the navigation model 90. At block 102, the method includes controlling output of the determined derate.

At block 106, the method may include receiving a user input signal comprising data identifying a selected derate. The selected derate may be the derate determined at block 100. At block 108, the method may include determining one or more propulsion system operational parameter thresholds using the derate determined at block 100, or using the selected derate from block 106 (which may be the same as the derate determined at block 100).

In parallel to blocks 100, 102, 106 and 108, at block 112, the method includes determining a trajectory for the vehicle 10 using the algorithm 94, the vehicle model 86, the propulsion system model 88, the objective function 92, and, optionally, the navigation model 90. At block 114, the method includes controlling output of the determined trajectory. At block 118, the method may include determining one or more vehicle operational parameters using the determined trajectory. It should be appreciated that blocks 112, 114 and 118 may be performed concurrently with blocks 100, 102, 106 108, or may be performed at a different time.

At block 122, the method may include controlling operation of the vehicle 10 using the determined one or more vehicle operational parameters and using the determined one or more propulsion system operational parameter thresholds. For example, the controller 60 may control the propulsion system 23 and the vehicle control system 67 so that the vehicle 10 moves along the determined trajectory 116 using the determined derate 104.

The methods illustrated in FIGS. 8, 9 and 10, and described in the preceding paragraphs may be advantageous in that they may enable the determination and implementation of an optimised derate 104 for the propulsion system 23, and/or an optimised trajectory 116 for the vehicle 10. In more detail, the methods enable the generation of derate and/or trajectory profiles that are optimised against a configurable set of criteria. For example, the criteria may allow the derate and/or trajectory to minimise a combination of engine health, fuel burn and time in flight phase (amongst other factors). The methods may advantageously allow complex models of health to be used with constraints to produce a feasible solution which minimises the objective function 92. Where the propulsion system 23 includes one or more electrical motors coupled to a fan or propeller for providing propulsive thrust to the aircraft 10, use of the optimised derate 104 and/or optimised trajectory 116 may advantageously reduce the noise generated by the propulsion system 23 and/or the noise received at a location on the ground.

The optimised solution may be calculated in terms of derate advantageously allowing integration into closed-loop control. In particular, the methods in FIGS. 8 and 10 yield a propulsion system derate schedule that may be translated into propulsion system parameter thresholds, whilst the vehicle 10 may still rely on closed-loop control systems (for example, the automatic flight control system 72 to perform flight guidance in the case of an aircraft).

The apparatus 58 may support the generation of multiple diverse solutions (that is, derates and trajectories), generated in different subsystems including off-board/cloud, and may arbitrate these using a voter mechanism (as per blocks 102 and 106). The automatic generation of derate trajectories from these subsystems may also contribute to workload reduction for the operator of the vehicle 10.

It will be understood that the disclosure is not limited to the embodiments above described and various modifications and improvements can be made without departing from the concepts described herein. For example, the different embodiments may take the form of an entirely hardware embodiment, an entirely software embodiment, or an embodiment containing both hardware and software elements.

Except where mutually exclusive, any of the features may be employed separately or in combination with any other features and the disclosure extends to and includes all combinations and sub-combinations of one or more features described herein.

We claim:

1. A computer-implemented method of enabling optimisation of derate for a propulsion system of a vehicle, the computer-implemented method comprising: calculating an optimized derate for the propulsion system of the vehicle using: an algorithm; a vehicle model defining path constraints for the vehicle through space; a propulsion system model defining parameters of the propulsion system; and an objective function defining one or more objectives; wherein the algorithm uses the vehicle model, the propulsion system model, and the objective function as inputs to optimize the derate for the propulsion system; controlling output of the optimized derate; determining one or more propulsion system operational parameter thresholds using the optimized derate; and controlling operation of the propulsion system using the one or more propulsion system operational parameter thresholds.

2. The computer-implemented method as claimed in claim 1, wherein controlling output includes controlling storage of the optimized derate in a memory.

3. The computer-implemented method as claimed in claim 1, wherein controlling output includes controlling an output device to provide a plurality of derate options to an operator, the plurality of derate options including the optimized derate.

4. The computer-implemented method as claimed in claim 3, further comprising: receiving a user input signal comprising data identifying a selected derate, the selected derate being one of the plurality of derate options; wherein determining the one or more propulsion system operational parameter thresholds uses the selected derate.

5. The computer-implemented method as claimed in claim 1, wherein determining the derate for the propulsion system of the vehicle further comprises using a navigation model defining navigation constraints for the vehicle.

6. The computer-implemented method as claimed in claim 5, further comprising: receiving navigation data for a location of the vehicle; and determining the navigation constraints using the received navigation data and the navigation model.

7. The computer-implemented method as claimed in claim 1, wherein the one or more objectives of the objective function comprises one or more of: degradation of the propulsion system; acoustic emissions of the propulsion system; combustion emissions of the propulsion system; and energy consumption of the propulsion system.

8. The computer-implemented method as claimed in claim 1, further comprising: receiving a user input signal comprising data identifying a user preference for the objective function; and changing the objective function to include the user preference.

9. The computer-implemented method as claimed in claim 1, wherein the algorithm is an optimisation algorithm.

10. The computer-implemented method as claimed in claim 1, wherein the parameters of the propulsion system include one or more of: operational parameters of the propulsion system; and health parameters of the propulsion system.

11. The computer-implemented method as claimed in claim 1, further comprising: determining a trajectory for the vehicle using the algorithm, the vehicle model, the propulsion system model, and the objective function.

12. The computer-implemented method as claimed in claim 1, wherein the vehicle is an aircraft and the optimized derate is for a take-off flight phase and a climb flight phase of the aircraft.

13. A non-transitory computer readable storage medium comprising computer readable instructions that, when executed by a computer, cause performance of the computer-implemented method as claimed in claim 1.

14. An apparatus for enabling optimisation of derate for a propulsion system of a vehicle, the apparatus comprising: a controller configured to perform the computer-implemented method as claimed in claim 1.

15. An apparatus as claimed in claim 14, wherein the apparatus comprises one or more of: an electronic flight bag; a flight management system; a full authority digital engine controller; and a data center that is remote from the vehicle.

16. The computer-implemented method as claimed in claim 1, wherein the algorithm is used to parse the path constraints of the vehicle model and parameters of the propulsion system model.

* * * * *